United States Patent [19]

Franceschini

[11] 4,242,500

[45] Dec. 30, 1980

[54] PROCESS FOR THE REMOVAL OF FREE ACRYLATE MONOMER FROM POLYACRYLATE COMPOSITIONS BY THE ADDITION OF ALKANOLAMINES

[75] Inventor: John M. Franceschini, Lower Plenty, Australia

[73] Assignee: Fabcote Manufacturing Proprietary Limited, Boxhill, Australia

[21] Appl. No.: 41,947

[22] Filed: May 24, 1979

[51] Int. Cl.³ .......................... C08F 6/00; C08F 6/16; C08F 6/28
[52] U.S. Cl. .................................................... 528/492
[58] Field of Search ........................................ 528/492

[56] References Cited

U.S. PATENT DOCUMENTS

| | | | |
|---|---|---|---|
| 3,448,081 | 6/1969 | Hafner et al. | 528/492 |
| 3,697,482 | 10/1972 | Hunsucker | 528/492 |
| 4,021,400 | 5/1977 | McKenna | 528/492 |

*Primary Examiner*—Harry Wong, Jr.
*Attorney, Agent, or Firm*—Parmelee, Johnson, Bollinger & Bramblett

[57] ABSTRACT

A process is provided for reduction in the amount of free acrylate monomer from compositions consisting of or containing polyacrylate. The process involves addition to the composition of an alkanolamine or an alkanediolamine, preferably one of the ethanolamines, which scavenges the free acrylate monomer present into an inert form.

12 Claims, No Drawings

PROCESS FOR THE REMOVAL OF FREE ACRYLATE MONOMER FROM POLYACRYLATE COMPOSITIONS BY THE ADDITION OF ALKANOLAMINES

This invention relates to a process for removal of free monomer from polymer and copolymer compositions. More particularly, the invention relates to removal of free acrylate monomer from a composition which represents the polymerisation product of an acrylate monomer, the polymerisation product of two or more acrylate monomers, or the polymerisation product of monomers, at least one of which is an acrylate monomer.

In the polymerisation of acrylate monomers and monomers containing acrylate monomers there usually remains in the polymerised product an amount of unreacted, or, free monomer.

Polymerised acrylate compounds find applicability in a number of commercial processes and their use is common in areas of manufacturing industry such as textiles, adhesives and paints. Due to the nature of most acrylate monomers, including those which are commercially employed on a relatively large scale, the presence of even very small amounts of free monomer in the polymer is highly undesirable. Most of the acrylate monomers have a strong offensive odour and this odour represents a substantial problem when using the polymerised product containing such amounts of free monomer, due to the pollution of the enviroment which results. The pollution adversely affecting both the conditions under which people in the enviroment must work, and, the acceptable level of pollution to the outside atmosphere.

In the past, attempts have been made to reduce the free monomer content of polymerised acrylates but those attempts have either been unsuccesful, or the methods employed require a great deal of time and equipment which make them commercially and sometimes practically, unacceptable.

It is an object of this invention to provide a method for treament of polymerised acrylate polymers and copolymers, whereby the free acrylate monomer is removed.

Throughout the specification the term "copolymer" will be used to mean a copolymer, at least one of the monomers of which is an acrylate monomer.

The term "a major amount" means at least 50% by weight.

It is also an object of the invention to provide a polymerised acrylate composition having a relatively low free monomer content.

According to the invention there is provided a process of lowering the free acrylate monomer content of a polymerised acrylate polymer or copolymer comprising adding to the polymer or copolymer an alkyl substituted or unsubstituted, alkanolamine or alkanediolamine, containing 2 to 8 carbon atoms, in an amount sufficient to neutralise a major amount of the free monomer.

The invention also includes polymerisation products treated in accordance with the method of the invention.

Preferably, the amount of alkanolamine added to the polymerisation product is at least equally molar with relation to the amount of free acrylate present. The preferred alkanolamines of the invention are those which contain two to four carbon atoms. The alkanolamine may be substituted in the alkanol portion. So that compounds such as 2-amino-2-methyl-1-propanol are included within the invention. The alkanolamine may also be a secondary or tertiary amine such as di- or tri-ethanolamine.

Further, the alkanolamine may also be diol compound such as 2-amino-2-ethyl-1,3-propanediol.

The most preferred compound of the invention is 2-amino-ethanol.

In order to more fully illustrate the invention the following example is provided in relation to polymerised ethyl acrylate.

The commercially employed method for production of polyethylacrylate is well known in this art and does not form any part of the present invention. A sample of polymerised ethyl acrylate from this process, which is commercially used for a number of further well known reactions, was analysed and contained a free ethyl acrylate monomer content of 0.43% by weight. The sample was obtained from the process as an emulsion containing 50% by weight of polyethylacrylate. To 200 kg of the emulsion there was added 1.5 kg of 2-amino-ethanol. The mixture was stirred and allowed to stand for 24 hours at ambient pressure and temperature. After this time the mixture was sampled and the amount of free ethyl acrylate monomer measured. The results showed that the free monomer content had dropped to 0.065% by weight, representing an 85% lowering of the free ethyl acrylate content. The 1.5 kg of 2-amino-ethanol added to the mixture represents a molar excess of the amine in relation to the amount of free monomer in the composition, presuming that one free acrylate molecular reacts with one molecular of 2-amino-ethanol.

While consideration has been given to the possible reactions which occur between the alkanolamine and the free acrylate monomer whereby the acrylate is neutralized, it has not been possible to determine exactly which reactions occur. It is clear, that the reaction involving neutralisation of the free monomer is a reversible one because it has been found that after a period of time following reaction, the free monomer content begins to increase.

At ambient temperature and pressure the preferred reaction time is 24 hours and under those conditions it is preferred that the treated polymerised acrylate be employed in its subsequent process or reactions within the 72 hours following completion of reaction. After this time the increase in the amount of free monomer in the composition is not insignificant and as depolyermisation is not likely, it is believed to be caused by the reversible nature of the reaction between the amine and the acrylate monomer.

Addition of further alkanolamine is possible to neutralize the increased free monomer, if the polyacrylate cannot be used within the recommended time.

To illustrate this point, if the 200 kg of polyethylacrylate treated in the above example is not used for 5 days after treatment in accordance with the process of the invention a further 1 kg of 2-amino-ethanol is added and the mixture again left at ambient pressure and temperature for 24 hours. After this time the free monomer content was found to be substantially the same as after the initial treatment.

Thus the most efficient way to employ the invention is to treat the acrylate only shortly before it is to be used.

The particular alkanolamine which could best be used for a particular polyacrylate will depend upon a number of factors, including the possibility that the reaction product of the alkanolamine and unreacted acrylate monomer will produce an undesirable by-product as far as the subsequent use of the polymerised acrylate is concerned. Such considerations will be readily appreciated by the person skilled in the art and may be easily determined by such a person.

The formation of such an undesirable by-product does not affect the working of the invention but simply produces commercially undesirable results.

I claim:

1. A process of lowering the free acrylate monomer content of a polymerized acrylate polymer composition comprising adding to the polymer composition an alkyl substituted or unsubstituted alkanolamine or alkanediolamine containing 2 to 8 carbon atoms, in an amount sufficient to neutralize a major amount of the free monomer.

2. A process as claimed in claim 1, wherein there is added an alkanolamine in an amount at least equimolar with relation to the amount of free acrylate monomer.

3. A process according to claim 1 or 2, wherein there is added an alkanolamine containing 2 to 4 carbon atoms.

4. A process according to claim 3, wherein the alkanolamine is 2-aminoethanol.

5. A process according to claim 1 or 4, wherein the polymerized polymer of the composition is a polymer of an acrylate monomer.

6. A process according to claim 1 or 4, wherein the polymerized acrylate polymer of the composition is the polymerization product of two or more acrylate monomers.

7. A process according to claim 1 or 4, wherein the polymerization acrylate polymer of the composition is a copolymer product of monomers, at least one of which is an acrylate monomer.

8. A process according to claim 1 or 2, wherein there is added an alkyl substituted or unsubstituted alkanediolamine.

9. A process according to claim 5, wherein the polymerized acrylate polymer of the composition is a polymerized alkyl acrylate.

10. A process according to claim 9, wherein the polymerized alkyl acrylate is polyethylacrylate.

11. A process of lowering the acrylate monomer content of a polyethylacrylate composition comprising adding 2-amino-ethanol thereto in an amount sufficient to neutralize a major amount of the free monomer.

12. A process according to claim 11, wherein the 2-aminoethanol is added in an amount at least equimolar with relation to the amount of free acid.

* * * * *